United States Patent
Tran et al.

(10) Patent No.: US 8,491,384 B2
(45) Date of Patent: Jul. 23, 2013

(54) MULTI-USER DISCOVERY

(75) Inventors: Dang Van Tran, Laguna Niguel, CA (US); Yingnan Zhu, Irvine, CA (US); Xing Zheng, Irvine, CA (US); Jaffar Khoshgozaran, Pasadena, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 99 days.

(21) Appl. No.: 13/244,069

(22) Filed: Sep. 23, 2011

(65) Prior Publication Data

US 2012/0276996 A1    Nov. 1, 2012

Related U.S. Application Data

(60) Provisional application No. 61/481,153, filed on Apr. 30, 2011.

(51) Int. Cl.
*A63F 9/24* (2006.01)

(52) U.S. Cl.
USPC .......................................................... 463/31

(58) Field of Classification Search
USPC .......................................................... 463/31
See application file for complete search history.

(56) References Cited

U.S. PATENT DOCUMENTS

| | | |
|---|---|---|
| 5,933,816 A | 8/1999 | Zeanah et al. |
| 6,064,980 A | 5/2000 | Jacobi et al. |
| 6,266,649 B1 | 7/2001 | Linden et al. |
| 6,859,937 B1 | 2/2005 | Narayan et al. |
| 7,478,089 B2 | 1/2009 | Henkin et al. |
| 7,668,821 B1 | 2/2010 | Donsbach et al. |
| 7,949,573 B1 | 5/2011 | Cohen et al. |
| 7,954,045 B2 | 5/2011 | Yamada et al. |
| 8,046,436 B2 | 10/2011 | Davies et al. |
| 8,341,521 B2 | 12/2012 | Ennals |
| 2002/0120925 A1 | 8/2002 | Logan |
| 2002/0147984 A1 | 10/2002 | Tomsen et al. |
| 2003/0037144 A1 | 2/2003 | Pestoni et al. |
| 2003/0200157 A1 | 10/2003 | Krajec |
| 2004/0039657 A1 | 2/2004 | Behrens et al. |
| 2005/0038804 A1 | 2/2005 | Shimizu |
| 2006/0069753 A1 | 3/2006 | Hu et al. |

(Continued)

OTHER PUBLICATIONS

U.S. Non-Final Office Action dated Nov. 9, 2012 for U.S. Appl. No. 13/244,050.

(Continued)

*Primary Examiner* — Omkar Deodhar
(74) *Attorney, Agent, or Firm* — Kenneth L. Sherman, Esq.; Michael Zarrabian, Esq.; Sherman & Zarrabian LLP (57) ABSTRACT

In a first embodiment of the present invention, a method is provided for enhancing full-app content playing on a first device, the method comprising: receiving a first selection of a first item from a first micro-app; receiving a second selection of a second item from a second micro-app, wherein the second micro-app is different than the first micro-app and the second selection is in a different format than the first selection; retrieving item context information regarding the first item; retrieving item context information regarding the second item; issuing a query to a micro-app partner based upon both the item context information regarding the first item and the item context information regarding the second item; receiving results from the micro-app partner; and causing at least a portion of the results to be displayed or played.

18 Claims, 9 Drawing Sheets

U.S. PATENT DOCUMENTS

| | | |
|---|---|---|
| 2006/0156252 A1 | 7/2006 | Sheshagiri et al. |
| 2006/0282856 A1 | 12/2006 | Errico et al. |
| 2007/0250808 A1 | 10/2007 | Zeanah et al. |
| 2008/0183698 A1 | 7/2008 | Messer et al. |
| 2009/0063990 A1 | 3/2009 | Morris et al. |
| 2009/0307105 A1* | 12/2009 | Lemay et al. .......... 705/26 |
| 2009/0327894 A1 | 12/2009 | Rakib |
| 2010/0009702 A1 | 1/2010 | James |
| 2010/0030624 A1 | 2/2010 | Vanska et al. |
| 2010/0082489 A1 | 4/2010 | Lin et al. |
| 2010/0142915 A1 | 6/2010 | McDermott et al. |
| 2010/0226526 A1 | 9/2010 | Modro et al. |
| 2010/0251280 A1 | 9/2010 | Sofos et al. |
| 2010/0312644 A1 | 12/2010 | Borgs et al. |
| 2011/0004533 A1 | 1/2011 | Soto et al. |
| 2011/0153447 A1 | 6/2011 | Thomas et al. |
| 2011/0225417 A1 | 9/2011 | Maharajh et al. |
| 2012/0054178 A1 | 3/2012 | Tran et al. |
| 2012/0054179 A1 | 3/2012 | Zhu et al. |
| 2012/0084183 A1 | 4/2012 | Shanker et al. |
| 2012/0278209 A1 | 11/2012 | Tran et al. |
| 2012/0278821 A1 | 11/2012 | Tran et al. |

OTHER PUBLICATIONS

U.S. Non-Final Office Action dated Jan. 30, 2013 for U.S. Appl. No. 13/244,062.

European Search Report dated Oct. 11, 2012 for European Application No. 12165886.8 from European Patent Office, pp. 1-7, Munich, Germany.

U.S. Final Office Action dated Apr. 1, 2013 for U.S. Appl. No. 13/244,050.

U.S. Final Office Action dated May 23, 2013 for U.S. Appl. No. 13/244,062.

* cited by examiner

MULTI-USER DISCOVERY

CROSS REFERENCE TO RELATED APPLICATIONS

This application claims the benefit of priority under 35 U.S.C. 119(e) to U.S. Provisional Patent Application No. 61/481,153, filed Apr. 30, 2011, which is incorporated herein by reference for all purposes.

BACKGROUND OF THE INVENTION

1. Field of the Invention

The present invention relates to consumer electronics. More specifically the present invention relates to the context-aware interaction integrated with media playing.

2. Description of the Related Art

The current media playing experience is, for the most part, a non-interactive and passive experience. For example, when viewing a television program on a television, the user simply watches the television. When a user listens to a music file on a portable media player, he or she simply listens to the music. While there are mechanisms available that allow users to use the same devices to interact with other data sources, such as a mechanism provided in newer televisions allowing users to surf the Internet while watching a program, the interaction is not geared specifically for the media being played. To the extent that a user wishes to "interact" with elements related to the media being played (such as, for example, purchasing a DVD copy of a television program being viewed), the user must do so manually.

Technologies exist that allow devices that have both media player and Internet-searching abilities to automatically switch between the two based upon the function currently being performed. For example, an options panel having a set of buttons can be used both in a television-playing mode and an Internet-surfing mode, providing a unified viewing experience. However, such technologies are limited to the system simply being aware of the current function being performed by the device, and the system does not take into account other factors, such as the media being played itself.

Furthermore, media playing is currently a single-device experience. While there may be any number of users watching or hearing media from a single device (such as a family sitting down and watching television together), the experience is limited to that single-device. It is becoming more and more prevalent, however, for there to be multiple accessible (and potentially Internet-enabled) devices usable within the same general area. For example, many individuals now carry cellular phones or other mobile communications devices with them at all times, many of which are Internet-enabled. Indeed, some mobile phones are "smart" enough to be considered mini-computers rather than what traditionally would be considered a phone. Additionally, tablet computers are becoming more prevalent, as are digital picture frames, which are also becoming Internet (or at least home network) enabled.

What is needed is a solution that improves upon these mechanisms.

SUMMARY OF THE INVENTION

In a first embodiment of the present invention, A method for enhancing content playing on a first device is provided, the method comprising: receiving a first selection of a first item from a first micro-app; retrieving item context information regarding the first item; issuing a first query to a first micro-app partner based upon the item context information regarding the first item; receiving first results from the micro-app partner; causing at least a portion of the first results to be displayed or played; receiving a second selection of a second item from a second micro-app, wherein the second micro-app is different than the first micro-app and the second selection is in a different format than the first selection; retrieving item context information regarding the second item; issuing a second query to the micro-app partner based upon both the item context information regarding the first item and the item context information regarding the second item; receiving second results from the micro-app partner; and causing at least a portion of the second results to be displayed or played.

In a second embodiment of the present invention, a method for enhancing content playing on a first device is provided, the method comprising: receiving a first selection of a first item from a first micro-app; retrieving item context information regarding the first item; issuing a query to a first micro-app partner based upon the item context information regarding the first item; receiving first results from the first micro-app partner; causing at least a portion of the first results to be displayed or played; receiving a second selection of a second item from a second micro-app, wherein the second micro-app is different than the first micro-app and the second selection is in a different format than the first selection; retrieving item context information regarding the second item; issuing a query to a second micro-app partner based upon the item context information regarding the second item; receiving second results from the second micro-app partner; combining the first results and the second results; and causing at least a portion of the combined results to be displayed or played.

In a third embodiment of the present invention, an apparatus is provided comprising: a processor; and a first micro-app configured to: receive a first selection of a first item from a first micro-app; retrieve item context information regarding the first item; issue a first query to a first micro-app partner based upon the item context information regarding the first item; receive first results from the micro-app partner; cause at least a portion of the first results to be displayed or played; receive a second selection of a second item from a second micro-app, wherein the second micro-app is different than the first micro-app and the second selection is in a different format than the first selection; retrieve item context information regarding the second item; issue a second query to the micro-app partner based upon both the item context information regarding the first item and the item context information regarding the second item; receive second results from the micro-app partner; and cause at least a portion of the second results to be displayed or played.

In a fourth embodiment of the present invention, a shared device comprising: means for receiving a first selection of a first item from a first micro-app; means for retrieving item context information regarding the first item; means for issuing a first query to a first micro-app partner based upon the item context information regarding the first item; means for receiving first results from the micro-app partner; means for causing at least a portion of the first results to be displayed or played; means for receiving a second selection of a second item from a second micro-app, wherein the second micro-app is different than the first micro-app and the second selection is in a different format than the first selection; means for retrieving item context information regarding the second item; means for issuing a second query to the micro-app partner based upon both the item context information regarding the first item and the item context information regarding the second item; means for receiving second results from the micro-app partner; and means for causing at least a portion of the second results to be displayed or played.

In a fifth embodiment of the present invention, a non-transitory program storage device readable by a machine tangibly embodying a program of instructions executable by the machine to perform a method comprising: receiving a first selection of a first item from a first micro-app; retrieving item context information regarding the first item; issuing a first query to a first micro-app partner based upon the item context information regarding the first item; receiving first results from the micro-app partner; causing at least a portion of the first results to be displayed or played; receiving a second selection of a second item from a second micro-app, wherein the second micro-app is different than the first micro-app and the second selection is in a different format than the first selection; retrieving item context information regarding the second item; issuing a second query to the micro-app partner based upon both the item context information regarding the first item and the item context information regarding the second item; receiving second results from the micro-app partner; and causing at least a portion of the second results to be displayed or played.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

An embodiment of the present invention introduces the concept of a "micro-app" (short for micro-application), which resides on one or more user devices. These micro-apps are designed to utilize context information in order to query one or more micro-app partners for result information. The context information can involve the media itself, the user, the device, or the general environment. Once this result information is received from the micro-app partner(s), it can be presented on the user devices. In this manner, the micro-apps provide the ability to automatically retrieve results relevant to the currently-playing media and display them to viewers as the media is being played.

In another embodiment of the present invention, context information from multiple micro-apps is retrieved and some combination of the context information from the multiple micro-apps is utilized to query one or more micro-app partners for result information. In some embodiments, the multiple micro-apps may not even be of the same type. For example, context information from an Amazon™ micro-app may be combined with context information from an eBay™ micro-app. This allows for a collaborative query to be performed even though multiple micro-apps may be used to formulate the query.

In a further embodiment of the present invention, users voluntarily provide context information from different micro-apps and a combination of the context information is used to query one or more micro-app partners for result information. In this manner, users may "throw" items to the system (i.e., select on an item using a corresponding micro-app and drag the item to a predetermined location). This may either be performed by one user on one device, or by several users on several devices. For example, a user may throw a book from an Amazon™ micro-app, and then throw a toy from an eBay™ micro-app. The system may then retrieve the context information for the book and the context information for the toy, and then conduct a query using a combination of these pieces of context information. The ultimate results returned may then represent a result that is based on both pieces of context information. Alternatively, the book may be thrown by one user on one device while the toy thrown by another user on another device.

In another embodiment of the present invention, the ultimate results returned to different devices or users are varied based upon context information related to the devices or users. For example, if a first user on a first device throws a book from an Amazon™ micro-app and a second user on a second device throws a toy from an eBay™ micro-app, each user may receive results related to the combination of the contexts of the book and the toy. However, each user's results may vary from each other. User will typically have a common discovery purpose in mind when the throw items, because they recognize that the system will take both users' context information into account when forming a new context to obtain results. The results presented back to the users may be filtered by the user's preference/context and hence may vary from each other in that way. Further, if the first user is an adult, for example, and the second user is a child, then the results the first user may see may include items more appropriate for an adult (DVDs, books, travel destinations, etc.), while the results for the second user may include items more appropriate for a child (toys, games, cartoons, etc.). These "customized" results may alternatively be based on device information, such as display size or processing capabilities.

In some embodiments, the results may be displayed on a device other than the one(s) that "threw" the items in the first place. For example, different users may "throw" items using their mobile phones while watching a shared television. The results of the collaborative search conducted based on the thrown items may then be displayed on the shared television. In this manner, a type of "group think" may be facilitated where the preferences of different viewers of a single television may be used to alter results displayed on the television.

It should be noted that it may be preferable in many circumstances to utilize several of the above embodiments together, as was described in the preceding paragraph, but it is also possible for one or more of the embodiments to be used independently. For example, items may be thrown by multiple users using the same micro-app. Various example implementations will be described in more detail later in this document. Nothing in this document shall be construed as limiting the scope of the claims to any particular embodiment(s).

The context information used to query the one or more content providers can be retrieved from a number of different sources. One source is the media being played itself. This type of context information may be called "media content context information" and may include any information about the media itself. One common source for such information can be metadata that accompanies the media. For television broadcasts, this information may be embedded in a digital broadcast stream. For over the top (OTT) video on demand (VOD) videos or photos, this information may be encoded in the downloaded media files, or may be transmitted separately. For DVD or Blu-Ray™ discs, this information may be encoded on the disk itself (such as in a dedicated metadata file), or may be available externally, such as using an external GD3 identification database. Normal video, photo, or music files stored on a hard disk drive can contain metadata information within the files themselves, such as the ID3 metadata in an mp3 file, or an xif file for a digital camera. Digital Living Network Alliance (DLNA) streams can include embedded metadata as well. Example of media content context information may include titles, genres, actors, directors, running times, scene information, music tracks, composers, authors, etc. Additional file streams, such as from social networking websites or from video streaming web sites can also be utilized with embodiments of the present invention. Additionally, files from non-media applications can also be utilized, such as news, maps, games, etc.

It should also be noted that the term "content provider" as used in this document shall be construed broadly to cover any entity that provides information or services that may be desired by the user. This may include textual information, graphical information, shopping capabilities, mapping tools, and so on. While some in the art make a distinction between "service provider" and "content provider," others in the art recognize that many providers blur the line between providing content and providing service and simply group all providers under the single title of "content provider." It is this latter definition that is used throughout this document.

It should also be noted that the term "media" as used in this document shall be interpreted broadly to include more than just traditional video, photos, and text, but also other information for user viewing or listening that is transmitted to a shared or interaction device. Thus, "media" can include, for example, text in a newsreader application, maps in a mapping application, or graphics in a game application, and thus the "media content context information" can include context information regarding these items as well. In some places in this document, the term "full-app content" is used in the place of media content to make explicitly clear that even non-media related content can be used as the basis for context information and for retrieving results related to the full-app content. Furthermore, this "full-app content" can come from many sources, including live television, media players, micro-app results, DVDs, HDMI ports, etc.

It should also be noted that the term "micro-app" as used in this document shall be interpreted broadly to include ay application that can be installed on a device that queries a content provider. However, in some embodiments the micro-app is connected to another application or service and provides limited micro-functions within the full application or service (called "full-app"). For example, an Amazon™ application might provide a full user interface to the Amazon.com™ marketplace, but an Amazon™ micro-app may provide only limited micro-functions (such as automatic search based on context, limited purchasing ability, etc.). A micro-function is a function that performs merely one action, such as "add-to-cart" or "add-to-favorites".

There are various other sources for context information than merely the media or full-app content itself. One such other source for context information is the user. Various information about the user can be retrieved either explicitly or implicitly. For example, a user profile may be stored that contains user information such as age, sex, interests, profession, etc. This type of context information may be useful in determining which information to retrieve from the content providers. For example, if a family is viewing a documentary program about Africa, it may be desirable to deliver to the children pictorial information about lions, giraffes, rhinoceroses, etc. (which can be delivered directly to the children's devices), while simultaneously delivering to the adults textual information about the history of the region being observed on adults' devices (or on a shared device). By including not only the media content context information but also the user context information, the system is able to deliver such personalization to individual devices.

The user profile is an example of explicitly-specified user context information, but this information may also be deduced from implicit sources. For example, the system may be able to deduce that a user is a child by examining the application usage history (or even just the applications loaded) on the user's device. If, for example, the device contains a lot of games typically played by young children, it can be deduced that the user of the device is a child.

Another source for context information is the device. Various information about the device can be retrieved either explicitly or implicitly. For example, a device profile may be stored that contains device information such as manufacturer, memory, processor speed, display characteristics, input devices, etc. This type of context information may also be useful in determining which information to retrieve from the micro-app partners. For example, if a family is viewing a comedy program, the system may determine it would be beneficial to distribute relevant information about the lead actor to the various devices, including, for example, information about recent projects that the lead actor is appearing in. If one device has much greater processing speed, memory availability, and display characteristics than another, it may be desirable, for example, to provide a video movie trailer for a recent movie the actor has appeared in to the more powerful device, while the less powerful device receives only textual information about the actor's new movie.

A device profile is an example of explicitly-specified device context information, but this information may also be deduced from implicit sources. For example, the system may be able to deduce that the device has the capability to play high definition video if there are a number of high-definition video files stored in the memory of the device.

Another source for context information is the environment in which the device is operating. This may include a variety of different things, including external environmental information (time of day, temperature, location, etc.) and internal environmental information (operating system, other applications being run simultaneously, etc.). This type of context information may also be useful in determining which information to retrieve from the micro-app partners. For example, if the location of the device is "at home," then the additional data downloaded from micro-app partners may be more recreational than if the device is "at work."

External context information can be retrieved from a variety of external sensors or devices. For time of day, for example, a clock device located on a motherboard may be accessed. For location, a global positioning sensor (GPS) or similar tracking device may be utilized. For temperature, a temperature sensor may be utilized (alternatively, location information may be fed to an external database where current temperature can be retrieved for the location).

Another source for context information is social networking data. For example, user status information from social networking web sites or data streams can be examined to determine a current status for the user, which then may be used to aid in serving results. For example, if the user indicated a Facebook™ status as "on vacation," a different set of results may be served than if the user had indicated that he was "at work."

In another embodiment, different weights can be assigned to different contexts according to other contexts. For example, a different weight may be assigned to a device of one user versus if that same device were operated by another user.

In one embodiment, shared data structure schema between micro-apps can be provided, allowing each of the micro-apps to become "context-aware" in a consistent manner. This allows media providers to feel more comfortable with undertaking the necessary steps to encode metadata or otherwise provide context information regarding their media, knowing that many different micro-apps will have access to that context information (as opposed to, for example, just one micro-app, if a proprietary metadata format is used). Thus, a system and a repository can be provided that allows micro-app partners to access a shared context to seamlessly enhance full-app content by providing relevant ancillary information about the content being viewed or heard.

Figure 1:
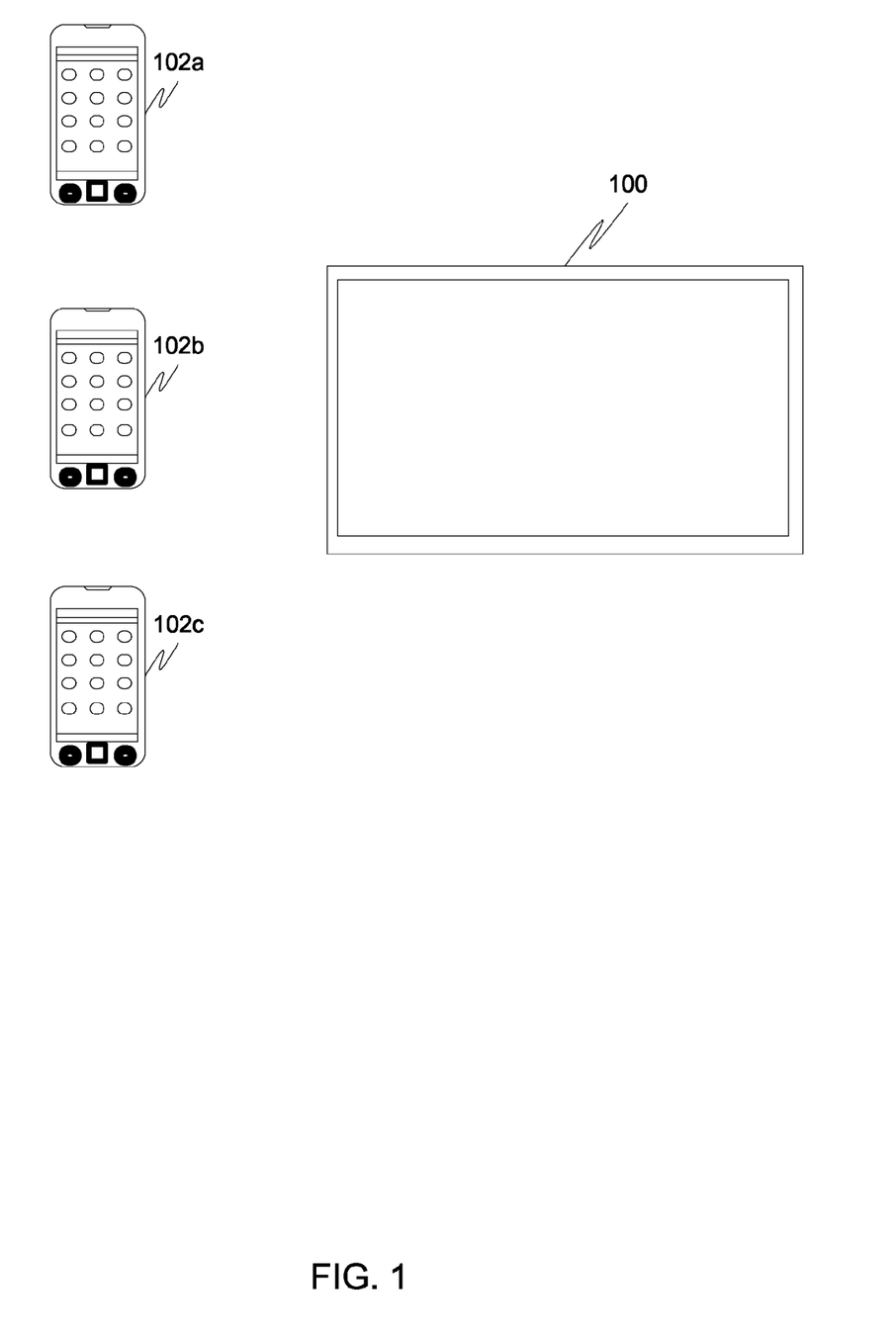
FIG. 1 is an example of a system in accordance with an embodiment of the present invention.

FIG. 1 is an example of a system in accordance with an embodiment of the present invention. Here, the television 100 acts as a shared device. Also included in the system are a series of interaction devices 102a, 102b, 102c, depicted as smart phones. Each of these interaction devices 102a, 102b, 102c may be operated by a different user (not pictured). Each interaction device 102a, 102b, 102c may include one or more micro-apps.

In one embodiment, users can initiate an augmented mode for the television (called TV+ mode) by pressing a button on a remote control (not pictured) or by using one of the interaction devices 102a, 102b, 102c. Alternatively, users can set the television to notify them of available content via a particular micro-app. Hereafter, any interaction with the TV+ mode is assumed to happen via one of the interaction devices 102a, 102b, 102c. Initiating the TV+ mode causes either the current media on the television 100 to shrink to a corner of the screen, allowing room for the TV+ experience, or the creation of an overlay for displaying TV+ content. This enables users to continue watching the current media while being able to interact with the micro-apps in a shared environment. It should be noted that in one embodiment the media playing on television 100 is not altered at all. In this embodiment, the entire TV+ experience can be experienced through the interaction devices 102a, 102b, 102c, and thus the shared media is not interrupted in any way. This allows, for example, users who are not at all interested in the interactive nature of a particular program to completely ignore the interactive aspects. For example, if a grandparent that does not have a smart phone is joining the family in watching a program in front of the shared television, he or she does not need to have any knowledge that the additional ancillary information is being provided to the other members of the family (via their interaction devices).

Figure 2:
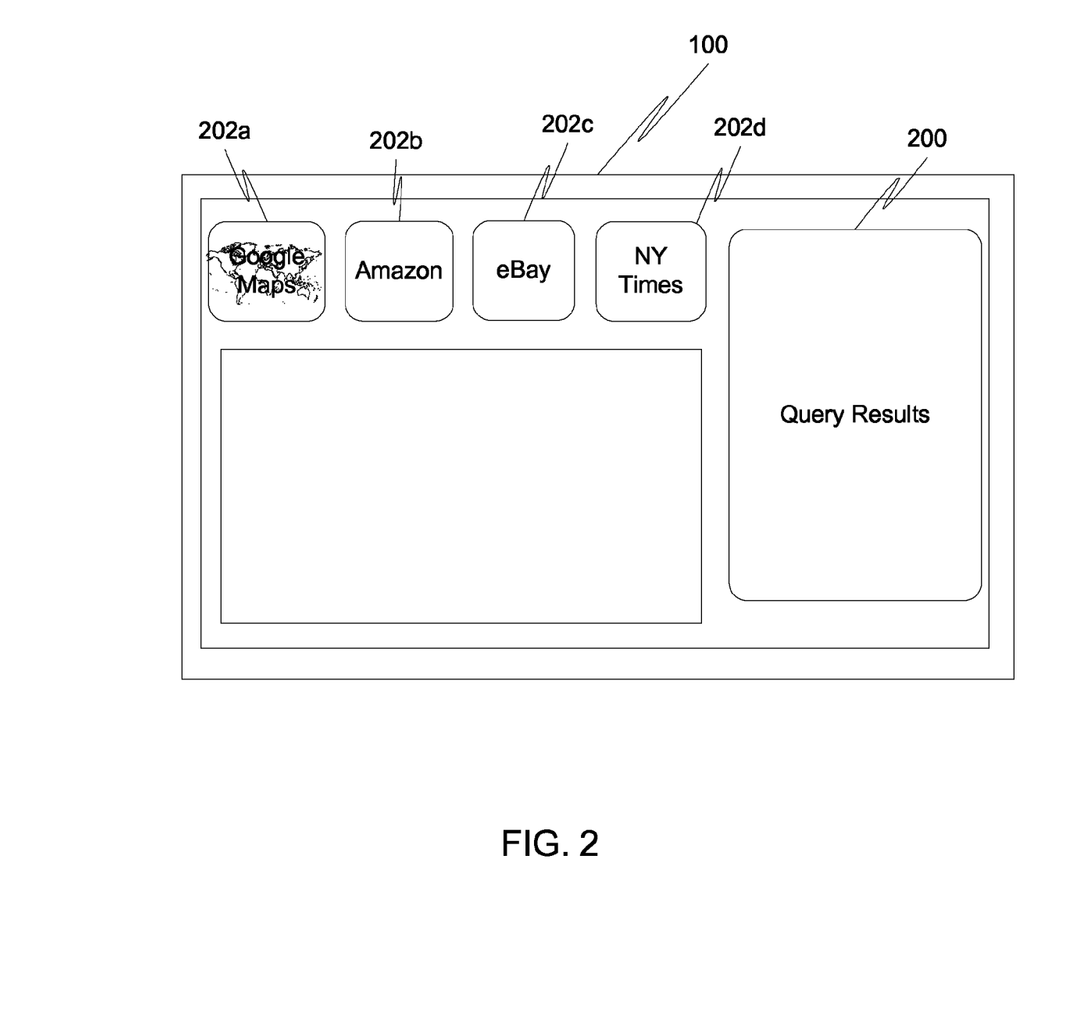
FIG. 2 is an example of shrinking media to a corner of a television to allow room for the TV+ experience in accordance with an embodiment of the present invention.

Nevertheless, FIG. 2 is an example of shrinking media to a corner of a television to allow room for the TV+ experience in accordance with an embodiment of the present invention. Here, upon execution of the TV+ mode, users are presented with a dashboard 200 on the television 100 that shows query results, and different micro-apps 202a, 202b, 202c.

The television dashboard 200 can also display a textual information bar regarding the current content being watched. On the interaction device-side, users can be presented with a list of available micro-apps to interact with along with the current media content. Users can then execute a certain micro-app to receive augmented information about the current media content. Doing so causes both the television and the smart phones to switch to the content retrieved from the selected micro-app while still allocating part of the television screen for current media display and part of the smart phone screen to display its own current content.

On the television-side, users can be navigated to the corresponding micro-app's homepage where, along with the current content, a list of current users logged in can be displayed. On the smart phone side, due to the availability of a personal screen, users can be presented with more information. This may include an information bar displaying textual information about the current media. This may also include a set of items relevant to the current media (retrieved from the micro-app content provided). These items can be grouped into logical categories for easier interactions (e.g., movies, music, toys, merchandise, etc.). This may also include a recommendation bar, whose content gets populated upon the selection of an item in the provided categories. In one implementation, each category can be represented in the form of a tab, allowing users to navigate between categories by selecting different tabs.

In some embodiments, search results (in the form of tags) may be presented in a synchronized fashion on interaction devices and the shared device, which allows the users to view and select items from individual interaction devices while sharing collaboratively on the communal shared device.

Figure 3:
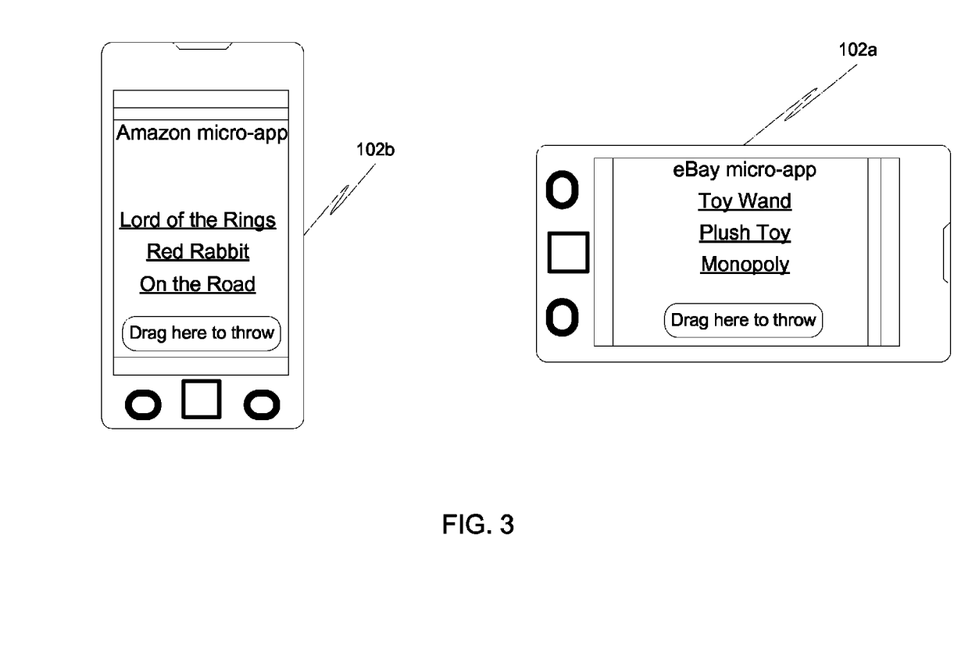
FIG. 3 is a diagram illustrating an example of users throwing items from multiple interaction devices to perform a collaborative search.

FIG. 3 is a diagram illustrating an example of users throwing items from multiple interaction devices to perform a collaborative search. Here, both smartphone 300 and smartphone 302 include an area of the screen 304, 306, respectively, dedicated to receiving items dragged from elsewhere on the screen. While smartphone 300 runs an Amazon™ micro-app, smartphone 302 runs an eBay™ micro-app. Despite the different micro-apps, users of the devices are able to drag respective items onto the dedicated "throw" areas 304, 306 to indicate an interest in the item. Context information related to the thrown objects may then be gathered and sent to another micro-app for querying.

Figure 4:
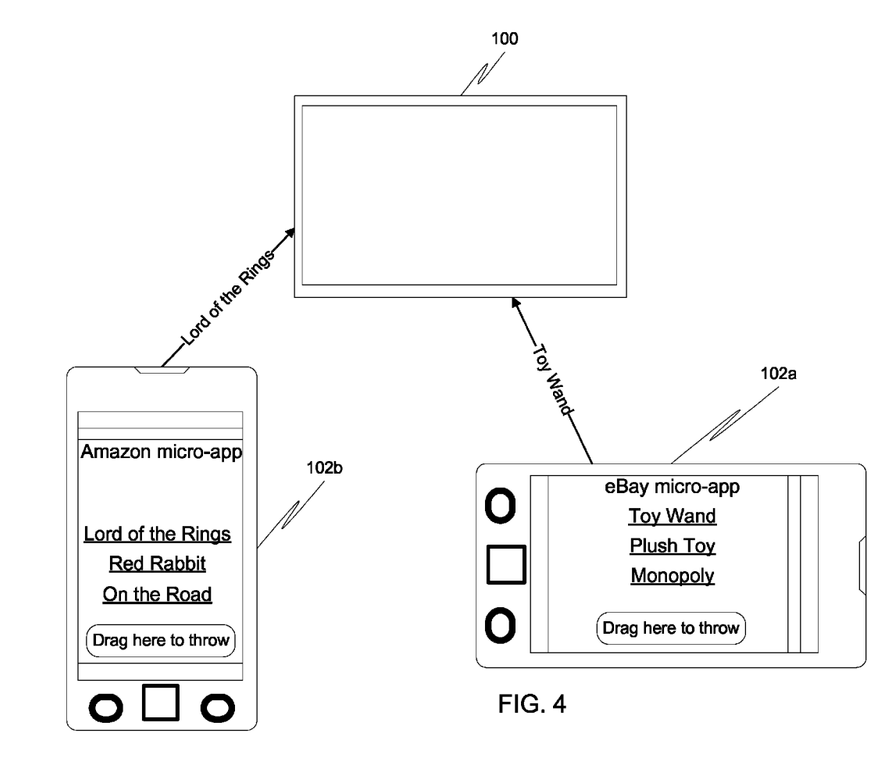
FIG. 4 is a diagram illustrating an example of a micro-app querying based on collaboratively thrown items in accordance with an embodiment of the present invention.

FIG. 4 is a diagram illustrating an example of a micro-app querying based on collaboratively thrown items in accordance with an embodiment of the present invention. Here, the user of smartphone 400 has thrown Lord of the Rings, a book title, from the Amazon™ micro-app. The user of smartphone 402 has thrown "Toy Wand", a description of a toy, from the eBay™ micro-app. A micro-app running on television 404 may then receive the context information related to these items (either received directly from the smartphones or by using information from the smartphones to perform a more detailed search for context information from an external source), and perform a query based a combination of the pieces of context information.

It should be noted that this embodiment depicts a micro-app running on a television as being the recipient of the context information and the device that performs the query. The micro-app, however, may be contained in any device, even within one or both of the smartphones 400, 402 themselves.

Figure 5:
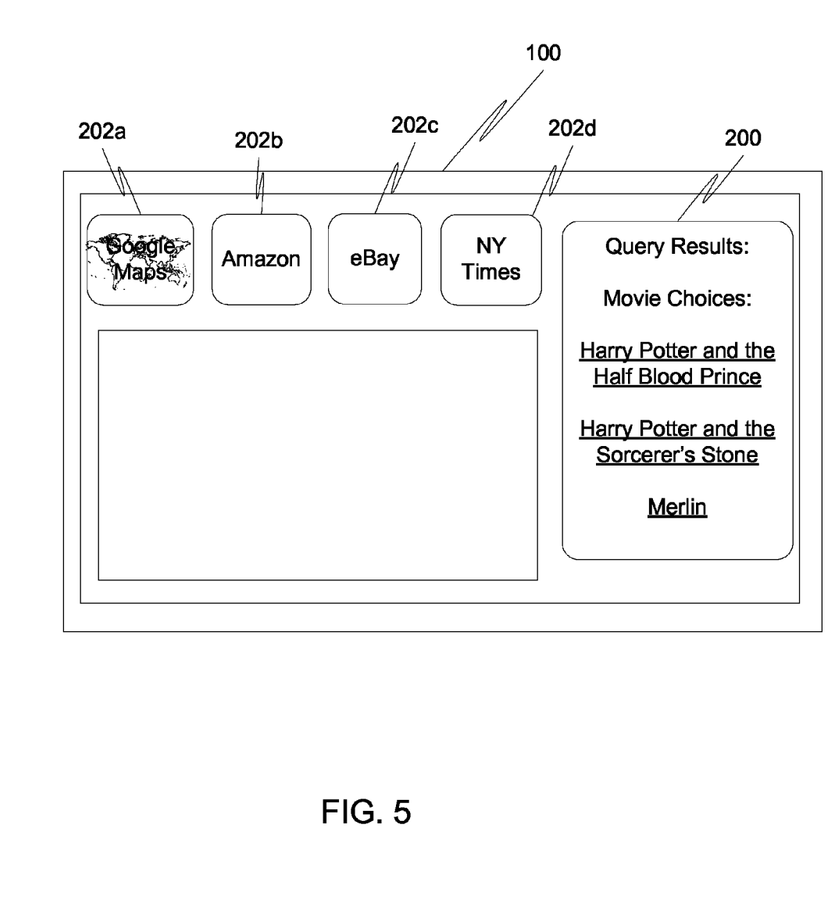
FIG. 5 depicts an embodiment where the television 500 displays query results in a dashboard 502.

How the results of the query are utilized can also vary from embodiment to embodiment. FIG. 5 depicts an embodiment where the television 500 displays query results in a dashboard 502. Here, the results represent movie titles that are related to the context information of "Lord of the Rings" and "Toy Wand", specifically fantasy movies involving magic.

Figure 6:
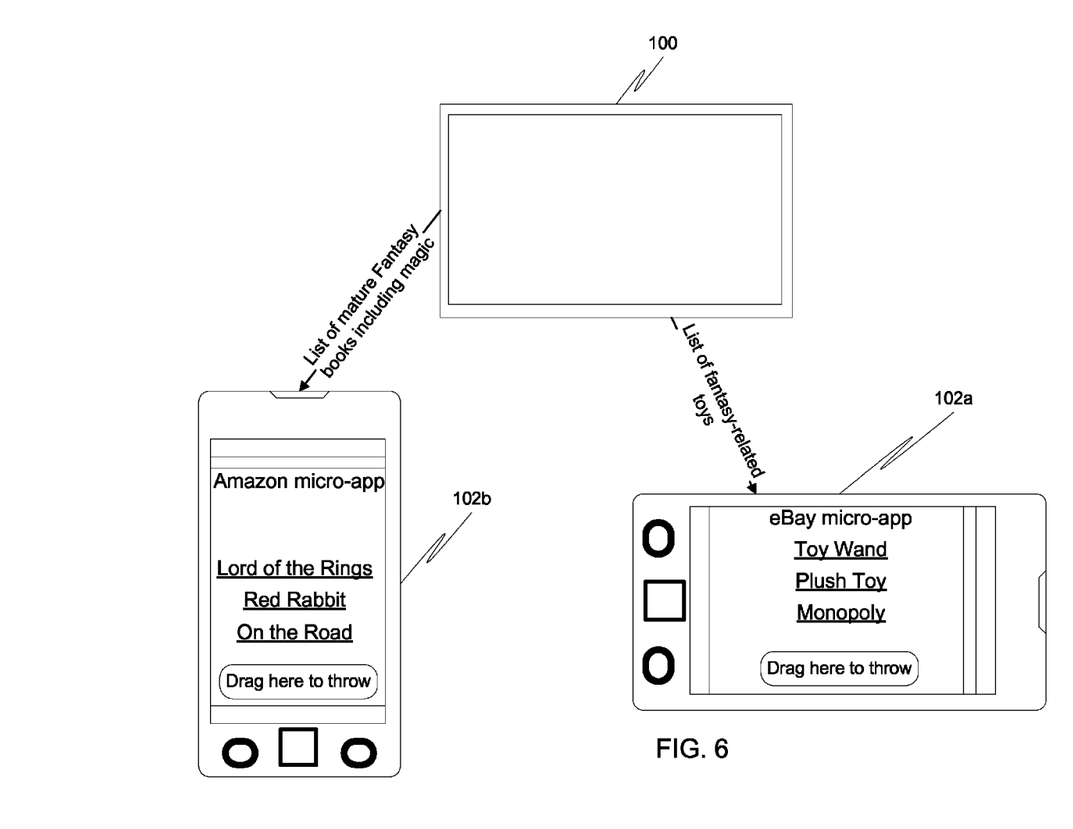
FIG. 6 depicts an embodiment where query results are sent from the television to each of the micro-apps.

FIG. 6 depicts an embodiment where query results are sent from the television to each of the micro-apps. In this embodiment, the different micro-apps that threw the items (which are also located on different devices) actually receive different results, even though both sets of results are based on the collaborative context information gathered from the selections on both smartphones. Here, for example, context information may indicate that the user of smartphone 600 is an adult whereas the user of smartphone 602 is a child. The context information may also indicate that the smartphone 600 is currently running an Amazon™ micro-app whereas smartphone 602 is currently running an eBay™ micro-app. As such, the results 604 sent to smartphone 600 may be a list of mature fantasy books including magic (which is based both on the selection of a fantasy book by smartphone 600 as well as by the selection of the toy wand by smartphone 602). Smartphone 602, on the other hand, may receive a list of fantasy-related toys (which is also based on the selections by both smartphone 600 and smartphone 602). As such, while the results received by both smartphone 600 and 602 are still collaborative in nature, they are customized for the device, user, or micro-app involved.

Figure 7:
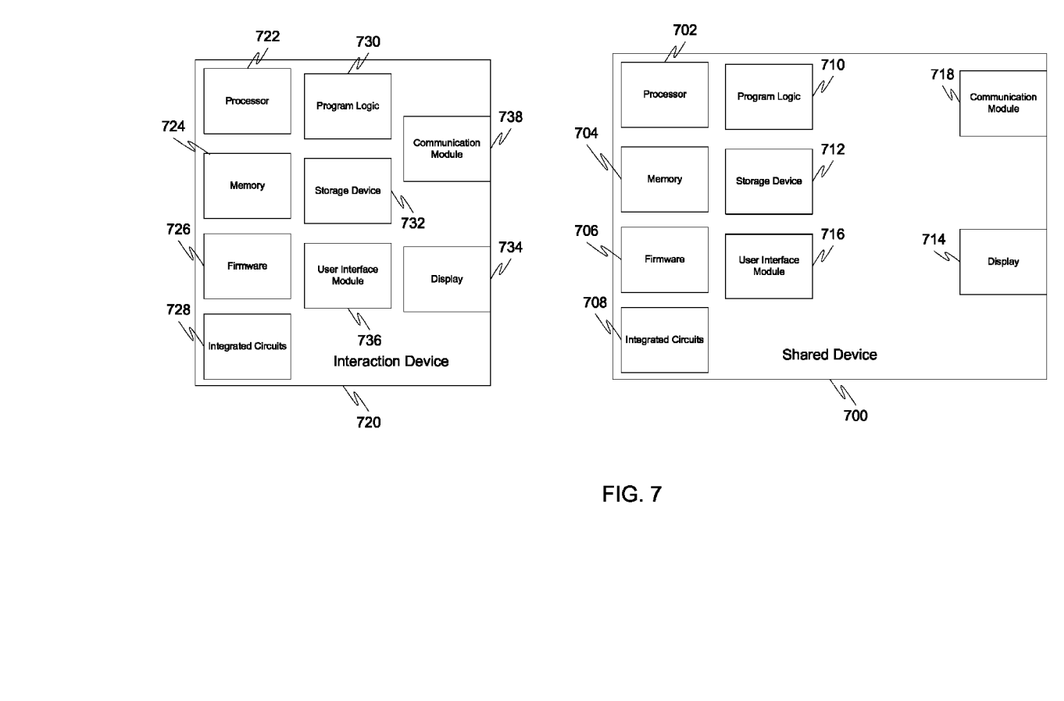
FIG. 7 depicts example hardware components in a shared device and one or more interaction devices, capable of implementing embodiments of the method and system disclosed herein.

FIG. 7 depicts example hardware components in a shared device and one or more interaction devices, capable of implementing embodiments of the method and system disclosed herein. In one embodiment, the shared device 700 comprises a television having a processor 702, memory 704, firmware 706, integrated circuits 708, program logic 710, a storage device 712, a communal display screen 714, a user interface module 716, and a communication module 718. The communication module 718 may be, for example, a network interface device or a wireless radio transmitter/receiver. In one embodiment, each interaction device 720 comprises a processor 722, memory 724, firmware 726, integrated circuits 728, program logic 730, a storage device 732, a personal display screen 734, a user interface module 736, and a communication module 738. Again, the communication module 738 may be, for example, a network interface device or a wireless radio transmitter/receiver. The shared device may communicate with each interaction device via a wired and/or wireless communication link. In one example embodiment, the shared device and/or interaction devices may communicate with external micro-app partners such as web servers, databases, networks, streaming sources, search engines, etc. via the Internet.

The system disclosed herein increases user engagement by allowing users to explore relevant content from a plurality of services and applications. The system decreases the time-to-build for development of consistent and context-aware micro-apps. The system allows multiple users to interact simultaneously with the shared device, each user having a private screen while the shared device displays the shared public data relevant to all users. The system also removes the burden of typing a search string for each service, hence enabling seamless ad automatic navigation between several micro-apps, and allowing for more intuitive exploration for users.

In another embodiment of the present invention, a "middleware" framework is provided that segregates micro-app partners from the micro-apps (and even fro the micro-app companies, in some embodiments). The framework allows it to not be necessary for the micro-app partners to even be aware of the micro-app companies, and vice-versa. Both entities can simply program against the middleware framework APIs. In this manner, any application or source (e.g., Blu-Ray™, Netflix™, DLNA media, WiseLink, non-media widgets) can collaborate with any other services (micro-apps) without any knowledge of the service convergence or mash-up outcomes. Additionally, the framework can automatically provide other context and a unified user interface for multiple interaction devices. Using various artificial intelligence engines, the framework can automatically improve the quality of microservice search results. Algorithms can include dynamic lookup tables based on multi-context info.

In one embodiment of the present invention, the system is extended to a cloud. In this manner, for example, the raw context can be retrieved from any number of different devices in different locations. Consumers have been accumulating volumes of digital assets and using more and more Internet services. Consumers typically access these assets and services using more than one device. A typical consumer may have a desktop computer, a laptop computer, and a cell phone (and possibly other devices as well) that can all be used to access and gather information and media. The trend will continue while huge amounts of services and contents are made available on the Web daily. These assets and services are typically scattered around in personal devices as well as in various informal groupings of information known as clouds. A cloud is a formal or informal grouping of information based on control. The present invention anticipates extending the augmented context systems in a similar manner.

Figure 8:
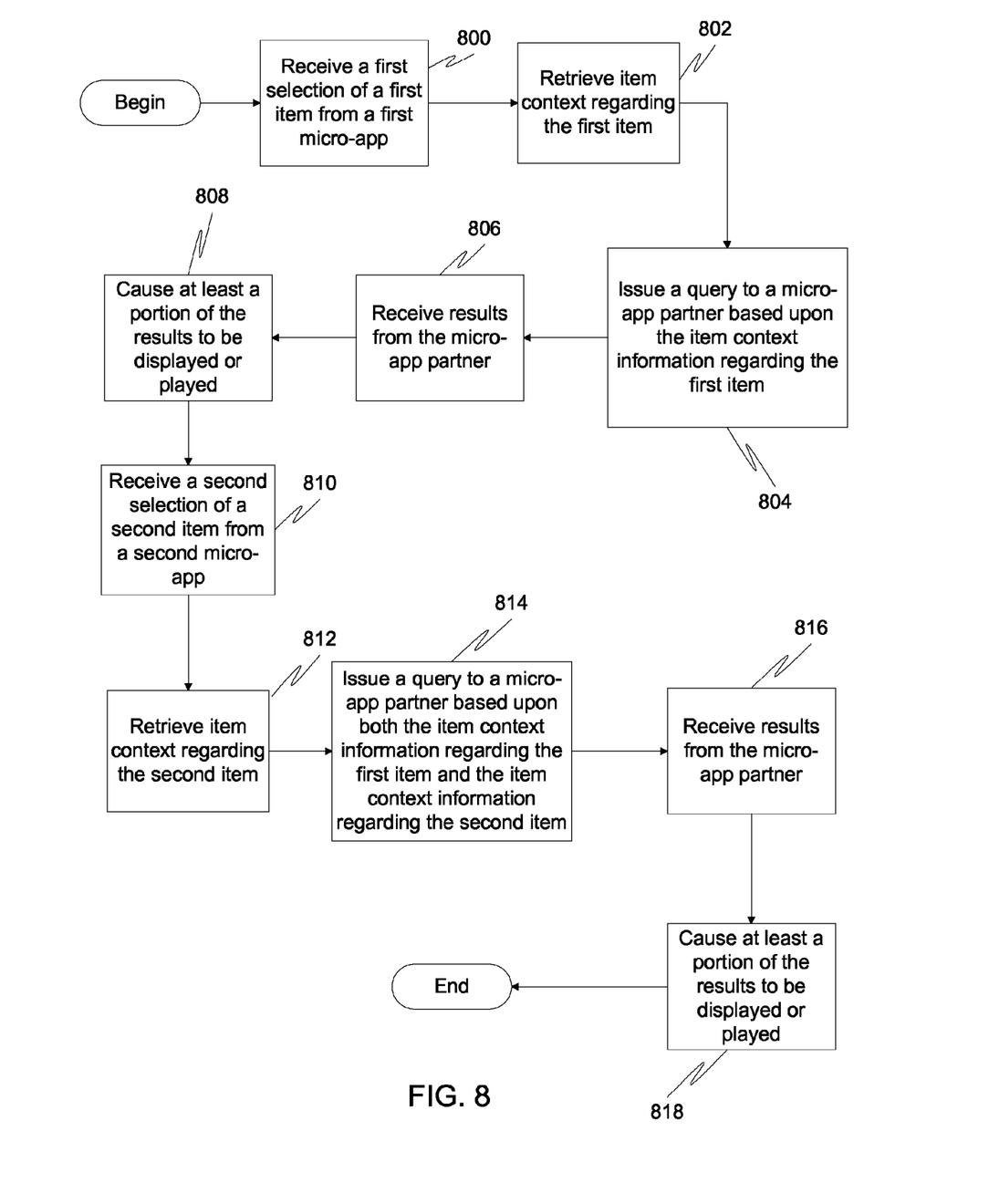
FIG. 8 is a flow diagram illustrating a method for enhancing full-app content playing on a first device in accordance with an embodiment of the present invention.

FIG. 8 is a flow diagram illustrating a method for enhancing content playing on a first device in accordance with an embodiment of the present invention. At 800, a first selection of a first item is received from a first micro-app. At 802, item context regarding the first item is retrieved. At 804, a query is issued to a micro-app partner based upon the item context information regarding the first item. At 806, results are received from the micro-app partner. At 808, at least a portion of the results are caused to be displayed or played. This can include using another micro-app to display or play a portion of the results, or sending the results back to the first micro-app for display.

At 810, a second selection of a second item is received from a second micro-app. The second micro-app may be different than the first micro-app, such that the second selection is in a different format that the first selection. At 812, item context information regarding the second item is retrieved. This retrieval of item context information may be performed simply by receiving context information sent from the first and second micro-apps, or alternatively some information from the first and second micro-apps can be used to query an external database for the item context information.

At 816, a query is issued to a micro-app partner based upon the both the item context information regarding the first item and the item context information regarding the second item. At 816, results are received from the micro-app partner. At 818, at least a portion of the results are caused to be displayed or played. This can include using another micro-app to display or play a portion of the results, or sending the results back to the first and/or second micro-apps for display.

It should be noted that while FIG. 8 depicts two rounds of items being selected, any number of rounds may be utilized. Indeed, the system can be designed to keep receiving selections of items and recommending new items on a cumulative basis until whatever point the system or user decides to "reset" the system or cache so as to only look at new items going forward.

Figure 9:
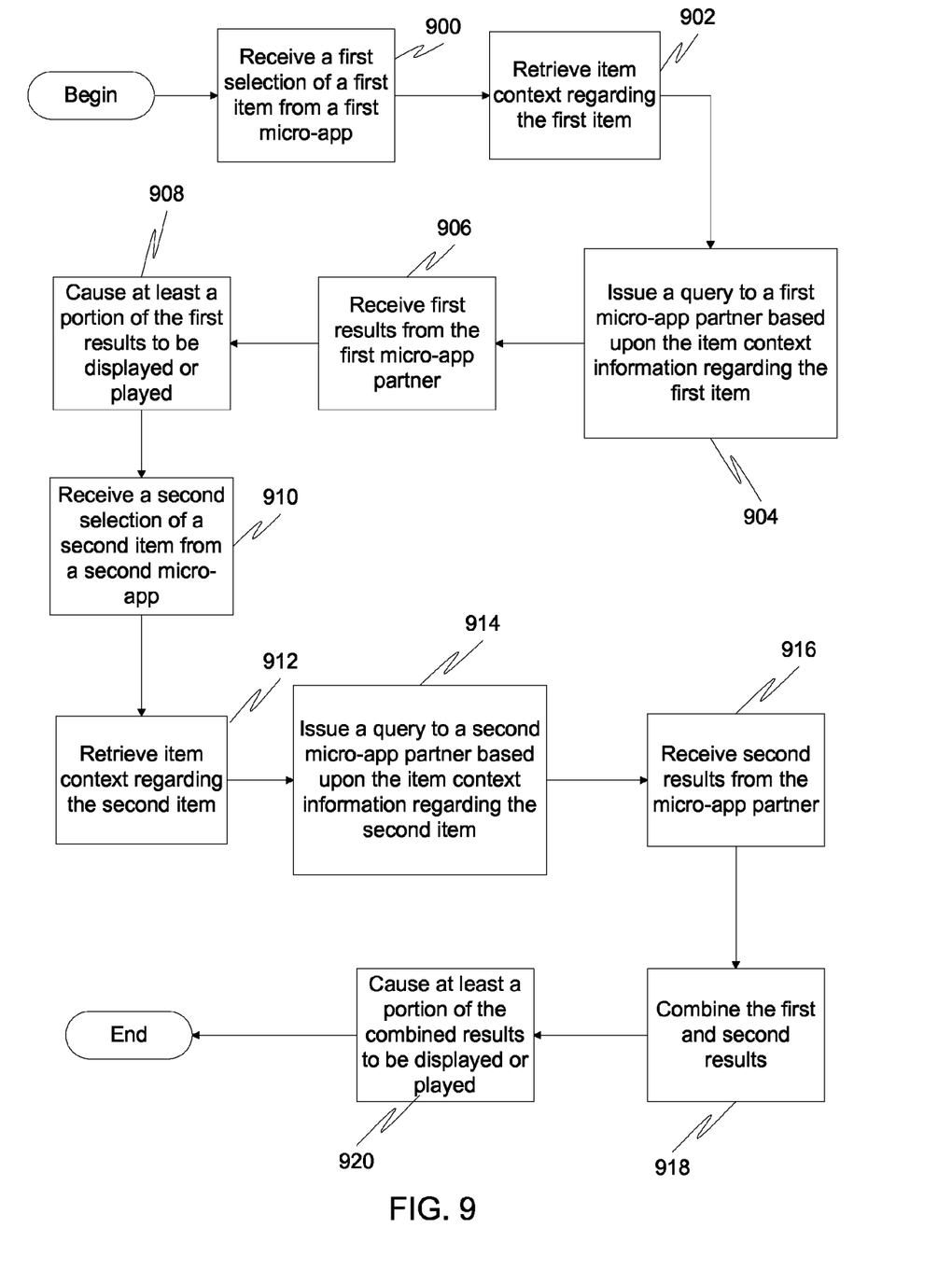
FIG. 9 is a flow diagram illustrating a method for enhancing content playing on a first device in accordance with another embodiment of the present invention.

FIG. 9 is a flow diagram illustrating a method for enhancing content playing on a first device in accordance with another embodiment of the present invention. Here, unlike in FIG. 8, queries are issued to multiple micro-app partners and the results received from the multiple micro-app partners are combined after the fact, rather than combining context information to be sent in a query to a single micro-app partner. At 900, a first selection of a first item is received from a first micro-app. At 902, item context information regarding the first item is retrieved. At 904, a query is issued to a first micro-app partner based upon the item context information regarding the first item. At 906, first results are received from the first micro-app partner. At 908, at least a portion of the first results are caused to be displayed or played.

At 910, a second selection of a second item is received from a second micro-app, wherein the second micro-app is different than the first micro-app and the second selection is in a different format than the first selection. At 912, item context information regarding the second item is retrieved. At 914, a query is issued to a second micro-app partner based upon the item context information regarding the second item. At 916, second results are received from the second micro-app partner.

At 918, the first and second results are combined. At 920, at least a portion of the combined results are caused to be displayed or played.

As will be appreciated to one of ordinary skill in the art, the aforementioned example architectures can be implemented in many ways, such as program instructions for execution by a processor, as software modules, microcode, as computer program product on computer readable media, as logic circuits, as application specific integrated circuits, as firmware, as consumer electronic device, etc. and may utilize wireless devices, wireless transmitters/receivers, and other portions of wireless networks. Furthermore, embodiment of the disclosed method and system for displaying multimedia content on multiple electronic display screens can take the form of an entirely hardware embodiment, an entirely software embodiment, or an embodiment containing both software and hardware elements.

The term "computer readable medium" is used generally to refer to media such as main memory, secondary memory, removable storage, hard disks, flash memory, disk drive memory, CD-ROM and other forms of persistent memory. It should be noted that program storage devices, as may be used to describe storage devices containing executable computer code for operating various methods of the present invention, shall not be construed to cover transitory subject matter, such as carrier waves or signals. Program storage devices and computer readable medium are terms used generally to refer to media such as main memory, secondary memory, removable storage disks, hard disk drives, and other tangible storage devices or components.

The various aspects, features, embodiments or implementations of the invention described above can be used alone or in various combinations. The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method for enhancing content playing on a first device, the method comprising:
   receiving a first selection of a first item from a first micro-app;
   retrieving item context information regarding the first item;
   issuing a first query to a first micro-app partner based upon the item context information regarding the first item;
   receiving first results from the micro-app partner;
   causing at least a portion of the first results to be displayed or played;
   receiving a second selection of a second item from a second micro-app, wherein the second micro-app is different than the first micro-app and the second selection is in a different format than the first selection;
   retrieving item context information regarding the second item;
   issuing a second query to the micro-app partner based upon both the item context information regarding the first item and the item context information regarding the second item;
   receiving second results from the micro-app partner; and
   causing at least a portion of the second results to be displayed or played.

2. The method of claim 1, wherein the causing at least a portion of the second results to be displayed or played includes using a micro-app to display or play at least a portion of the results.

3. The method of claim 1, wherein the causing at least a portion of the second results to be displayed or played includes sending the results to the first and second micro-apps.

4. The method of claim 3, wherein the method is performed by a micro-app and the first and second micro-apps are located on devices separate from one another and separate from a device running the micro-app performing the method.

5. The method of claim 4, wherein results from the second results that are sent to the first micro-app are different than results from the second results that are sent to the second micro-app.

6. The method of claim 5, further comprising filtering the second results differently for the first micro-app than for the second micro-app, based on device context information received from the first micro-app and the second micro-app.

7. The method of claim 5, further comprising filtering the second results differently for the first micro-app than for the second micro-app, based on user context information received from the first micro-app and the second micro-app.

8. The method of claim 1, wherein the format of the first selection is a product and the format of the second selection is a movie.

9. The method of claim 1, wherein the retrieving item context information regarding the first item includes receiving item context information from the first micro-app.

10. The method of claim 1, wherein the retrieving item context information regarding the first item includes using information about the first selection to query an external database for item context information corresponding to the first selection.

11. A method for enhancing content playing on a first device, the method comprising:
receiving a first selection of a first item from a first micro-app;
retrieving item context information regarding the first item;
issuing a query to a first micro-app partner based upon the item context information regarding the first item;
receiving first results from the first micro-app partner;
causing at least a portion of the first results to be displayed or played;
receiving a second selection of a second item from a second micro-app, wherein the second micro-app is different than the first micro-app and the second selection is in a different format than the first selection;
retrieving item context information regarding the second item;
issuing a query to a second micro-app partner based upon the item context information regarding the second item;
receiving second results from the second micro-app partner;
combining the first results and the second results; and
causing at least a portion of the combined results to be displayed or played.

12. The method of claim 11, wherein the causing at least a portion of the combined results to be displayed or played includes displaying a different subset of the combined results on a device running the first micro-app than displayed on a device running the second micro-app.

13. An apparatus comprising:
a processor; and
a first micro-app configured to:
receive a first selection of a first item from a first micro-app;
retrieve item context information regarding the first item;
issue a first query to a first micro-app partner based upon the item context information regarding the first item;
receive first results from the micro-app partner;
cause at least a portion of the first results to be displayed or played;
receive a second selection of a second item from a second micro-app, wherein the second micro-app is different than the first micro-app and the second selection is in a different format than the first selection;
retrieve item context information regarding the second item;
issue a second query to the micro-app partner based upon both the item context information regarding the first item and the item context information regarding the second item;
receive second results from the micro-app partner; and
cause at least a portion of the second results to be displayed or played.

14. The apparatus of claim 13, further comprising a display.

15. A shared device comprising:
means for receiving a first selection of a first item from a first micro-app;
means for retrieving item context information regarding the first item;
means for issuing a first query to a first micro-app partner based upon the item context information regarding the first item;
means for receiving first results from the micro-app partner;
means for causing at least a portion of the first results to be displayed or played;
means for receiving a second selection of a second item from a second micro-app, wherein the second micro-app is different than the first micro-app and the second selection is in a different format than the first selection;
means for retrieving item context information regarding the second item;
means for issuing a second query to the micro-app partner based upon both the item context information regarding the first item and the item context information regarding the second item;
means for receiving second results from the micro-app partner; and
means for causing at least a portion of the second results to be displayed or played.

16. The shared device of claim 15, further comprising:
means for performing filtering of the received second results.

17. The shared device of claim 16, wherein the shared device is a television.

18. A non-transitory program storage device readable by a machine tangibly embodying a program of instructions executable by the machine to perform a method comprising:
receiving a first selection of a first item from a first micro-app;
retrieving item context information regarding the first item;
issuing a first query to a first micro-app partner based upon the item context information regarding the first item;
receiving first results from the micro-app partner;
causing at least a portion of the first results to be displayed or played;
receiving a second selection of a second item from a second micro-app, wherein the second micro-app is different than the first micro-app and the second selection is in a different format than the first selection;
retrieving item context information regarding the second item;
issuing a second query to the micro-app partner based upon both the item context information regarding the first item and the item context information regarding the second item;
receiving second results from the micro-app partner; and
causing at least a portion of the second results to be displayed or played.

* * * * *